US008855048B2

(12) United States Patent
Abraham et al.

(10) Patent No.: US 8,855,048 B2
(45) Date of Patent: Oct. 7, 2014

(54) METHOD AND SYSTEM FOR PEER-TO-PEER CELLULAR COMMUNICATIONS

(75) Inventors: Charles Abraham, Los Gato, CA (US); Xuemin Sherman Chen, Rancho Santa Fe, CA (US); Wael William Diab, San Francisco, CA (US); Vinko Erceg, Cardiff, CA (US); Victor T. Hou, La Jolla, CA (US); Jeyhan Karaoguz, Irvine, CA (US); Mark Kent, Vista, CA (US)

(73) Assignee: Broadcom Corporation, Irvine, CA (US)

( * ) Notice: Subject to any disclaimer, the term of this patent is extended or adjusted under 35 U.S.C. 154(b) by 875 days.

(21) Appl. No.: 12/395,410

(22) Filed: Feb. 27, 2009

(65) Prior Publication Data

US 2010/0220642 A1    Sep. 2, 2010

(51) Int. Cl.
*H04W 4/00* (2009.01)
*H04B 7/00* (2006.01)
*H04L 12/28* (2006.01)
*H04L 12/66* (2006.01)
*H04W 40/00* (2009.01)

(52) U.S. Cl.
USPC ........ 370/328; 370/338; 370/310.2; 370/351; 370/356; 370/392; 370/397; 370/399; 370/395.31; 455/428; 455/445; 455/426.2

(58) Field of Classification Search
USPC .............. 455/428, 445, 33.4, 426.2; 370/328, 370/338, 310.2, 351, 356, 392, 397, 399, 370/395.31
See application file for complete search history.

(56) References Cited

U.S. PATENT DOCUMENTS

| 6,580,704 B1 * | 6/2003 | Wellig et al. ................... 370/338 |
| 7,209,739 B1 * | 4/2007 | Narayanabhatla ......... 455/426.2 |
| 7,437,161 B2 * | 10/2008 | Haner et al. ................... 455/442 |

(Continued)

FOREIGN PATENT DOCUMENTS

| WO | WO2005021022 | 3/2005 |
| WO | 2007/000455 | 1/2007 |
| WO | WO 2009012187 A2 * | 1/2009 .............. H04L 12/66 |

OTHER PUBLICATIONS

Unpublished U.S. Appl. No. 12/391,009, filed Feb. 23, 2009.

(Continued)

*Primary Examiner* — Jinsong Hu
*Assistant Examiner* — Dung Hong
(74) *Attorney, Agent, or Firm* — Sterne, Kessler, Goldstein & Fox P.L.L.C.

(57) ABSTRACT

Aspects of a method and system for peer-to-peer cellular communications are provided in which one or more cellular communication channels may be established between a femtocell and a plurality of communication devices. The femtocell may control routing of data between the plurality of communication devices via the one or more cellular communication channels. The femtocell may enable multicasting and/or broadcasting data from one of the communication devices to two or more remaining ones of the communication devices. The multicast and/or broadcast data may be communicated via the cellular communication channels and may be additionally communicated via an IP connection to the femtocell. Data may be communicated over the cellular communication channels in compliance with 3rd generation partnership project (3GPP) standards and/or 3rd generation partnership project 2 (3GPP2) standards. The femtocell may reformat data prior to communicating it to one or more of the plurality of communication devices.

23 Claims, 7 Drawing Sheets

(56) References Cited

U.S. PATENT DOCUMENTS

| | | |
|---|---|---|
| 2002/0113861 A1* | 8/2002 | Lim et al. .................... 348/14.02 |
| 2004/0062214 A1* | 4/2004 | Schnack et al. ............... 370/315 |
| 2006/0209795 A1 | 9/2006 | Chow et al. |
| 2007/0121655 A1 | 5/2007 | Jin |
| 2008/0083022 A1* | 4/2008 | Lee et al. ........................ 726/5 |
| 2008/0207170 A1* | 8/2008 | Khetawat et al. ............. 455/411 |
| 2008/0216145 A1 | 9/2008 | Barton et al. |
| 2008/0244148 A1* | 10/2008 | Nix et al. ...................... 710/313 |
| 2008/0261602 A1* | 10/2008 | Livneh ......................... 455/442 |
| 2008/0291862 A1* | 11/2008 | Lu ................................ 370/312 |
| 2009/0042536 A1 | 2/2009 | Bernard et al. |
| 2009/0061873 A1* | 3/2009 | Bao et al. ..................... 455/436 |
| 2009/0092081 A1 | 4/2009 | Balasubramanian et al. |
| 2009/0098858 A1 | 4/2009 | Gogic |
| 2009/0164547 A1 | 6/2009 | Ch'ng |
| 2009/0252088 A1* | 10/2009 | Rao et al. ...................... 370/328 |
| 2009/0279430 A1 | 11/2009 | Huber et al. |
| 2009/0286540 A1* | 11/2009 | Huber et al. ................ 455/435.1 |
| 2009/0288144 A1 | 11/2009 | Huber et al. |
| 2009/0292799 A1 | 11/2009 | Eisener et al. |
| 2009/0316649 A1 | 12/2009 | Chen |
| 2010/0167734 A1 | 7/2010 | Jones et al. |
| 2010/0182991 A1 | 7/2010 | Abraham et al. |
| 2010/0184411 A1 | 7/2010 | Chen et al. |
| 2010/0184414 A1 | 7/2010 | Abraham et al. |
| 2010/0184423 A1 | 7/2010 | Kent et al. |
| 2010/0184450 A1 | 7/2010 | Chen et al. |
| 2010/0186027 A1 | 7/2010 | Hou et al. |
| 2010/0210239 A1 | 8/2010 | Karaoguz et al. |
| 2010/0220642 A1 | 9/2010 | Abraham et al. |
| 2010/0220692 A1 | 9/2010 | Diab et al. |
| 2010/0220731 A1 | 9/2010 | Diab et al. |
| 2010/0222054 A1 | 9/2010 | Abraham et al. |
| 2010/0222069 A1 | 9/2010 | Abraham et al. |
| 2010/0238836 A1 | 9/2010 | Diab et al. |
| 2010/0265867 A1* | 10/2010 | Becker et al. ................ 370/312 |
| 2010/0315992 A1* | 12/2010 | Turanyi ........................ 370/315 |

OTHER PUBLICATIONS

Unpublished U.S. Appl. No. 12/395,470, filed Feb. 27, 2009.
Unpublished U.S. Appl. No. 12/406,835, filed Mar. 18, 2009.
Unpublished U.S. Appl. No. 12/395,383, filed Feb. 27, 2009.
Unpublished U.S. Appl. No. 12/395,313, filed Feb. 27, 2009.
Unpublished U.S. Appl. No. 12/395,436, filed Feb. 27, 2009.
European Search Report corresponding to European Patent Application No. 10001341.6-1244, dated Jul. 5, 2010.

* cited by examiner

METHOD AND SYSTEM FOR PEER-TO-PEER CELLULAR COMMUNICATIONS

CROSS-REFERENCE TO RELATED APPLICATIONS/INCORPORATION BY REFERENCE

Not Applicable

FIELD OF THE INVENTION

Certain embodiments of the invention relate to communications. More specifically, certain embodiments of the invention relate to a method and system for peer-to-peer cellular communications.

BACKGROUND OF THE INVENTION

A femtocell may be placed in a customer's residence or in a small business environment, for example. Femtocells may be utilized for off-loading macro radio network facilities, improving coverage locally in a cost-effective manner, and/or implementing home-zone services to increase revenue. Femtocells, like macro base stations, may be enabled to connect "standard" phones to a cellular provider's network by a physical broadband connection which may be a digital subscriber line (DSL) connection and/or a cable connection, for example. Since the traffic between a customer's premises femtocell equipment and the operator's network may be traversing a public network, the traffic may be prone to various risks.

Communication between femtocells and one or more cellular provider's networks enables operation in private and public areas. The capacity of a femtocell may be adequate to address a typical family use model supporting two to four simultaneous voice calls and/or data, for example.

An important characteristic of femtocells is their ability to control access. In an open access scenario, any terminal and/or subscriber may be allowed to communicate with the femtocell. Accordingly, the femtocell usage may somewhat resemble that of a macrocellular system. In a closed access scenario, the femtocell may serve a limited number of terminals and/or subscribers that may be subscribed to a given cellular base station. In this regard, the cellular base station may be perceived as being deployed for private usage.

A regulatory issue with regard to femtocells is that they use licensed frequencies that radiate at a very low power in a controlled environment. It may be likely that they may not require a license from a local authority, as macrocellular base stations do. An additional regulatory issue may arise from the relationship between a femtocell operator and a broadband services operator. One possible scenario may include the broadband operator being unaware of the existence of a femtocell operator. Conversely, the broadband operator and femtocell operator may have an agreement or they may be the same operator, for example. Interference between femtocells may be an issue for femtocell deployments based on wideband technologies such as WCDMA, for example, because initial operator deployments may use the same frequency for both the femtocell and the macrocellular networks or due to the proximity of femtocell base stations in dense urban areas.

There are a plurality of design models for deployment and integration of femtocells, for example, an IP based Iu-b interface, a session initiation protocol (SIP) based approach using an Iu/A interface, use of unlicensed spectrum in a technique known as unlicensed mobile access (UMA) and/or use of IP multimedia subsystem (IMS) voice call continuity (VCC), for example.

In an Iu-b model based femtocell deployment approach, femtocells may be fully integrated into the wireless carrier's network and may be treated like any other remote node in a network. The Iu-b protocol may have a plurality of responsibilities, such as the management of common channels, common resources, and radio links along with configuration management, including cell configuration management, measurement handling and control, time division duplex (TDD) synchronization, and/or error reporting, for example. In Iu-b configurations, mobile devices may access the network and its services via the Node B link, and femtocells may be treated as traditional base stations.

In a SIP based femtocell deployment approach, a SIP client, embedded in the femtocell may be enabled to utilize SIP to communicate with the SIP-enabled mobile switching center (MSC). The MSC may perform the operational translation between the IP SIP network and the traditional mobile network, for example.

In a UMA based femtocell deployment approach, a generic access network (GAN) may offer an alternative way to access GSM and GPRS core network services over broadband. To support this approach, a UMA Network Controller (UNC) and protocols that guarantee secure transport of signaling and user traffic over IP may be utilized. The UNC may be enabled to interface into a core network via existing 3GPP interfaces, for example, to support core network integration of femtocell based services by delivering a standards based, scalable IP interface for mobile core networks.

In an IMS VCC based femtocell deployment approach, VCC may provide for a network design that may extend an IMS network to include cellular coverage and address the handoff process. The IMS VCC may be designed to provide seamless call continuity between cellular networks and any network that supports VoIP, for example. The VCC may also provide for interoperability between GSM, UMTS, and CDMA cellular networks and any IP capable wireless access network, for example. The IMS VCC may also support the use of a single phone number or SIP identity and may offer a broad collection of functional advantages, for example, support for multiple markets and market segments, provisioning of enhanced IMS multimedia services, including greater service personalization and control, seamless handoff between circuit-switched and IMS networks, and/or access to services from any IP device.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for peer-to-peer cellular communications, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for peer-to-peer cellular communications. In various embodiments of the invention, one or more cellular communication channels may be established between a femtocell and a plurality of communication devices. The femtocell may control the routing of data between the plurality of communication devices via the one or more cellular communication channels. The femtocell may enable multicasting and/or broadcasting of data from one of the communication devices to two or more remaining ones of the communication devices. The multicast and/or broadcast data may be communicated via the cellular communication channels and may be additionally communicated via an IP connection to the femtocell. Data may be communicated over the cellular communication channels in compliance with 3rd generation partnership project (3GPP) standards and/or 3rd generation partnership project 2 (3GPP2) standards. The data may comprise voice, Internet traffic and/or data, and/or multimedia content. The femtocell may reformat data prior to communicating it to one or more of the plurality of communication devices. In various exemplary embodiments of the invention, one or more look-up tables, registers, and/or other methods may be utilized to determine whether a communication device is within cellular communication range of the femtocell.

Figure 1A:
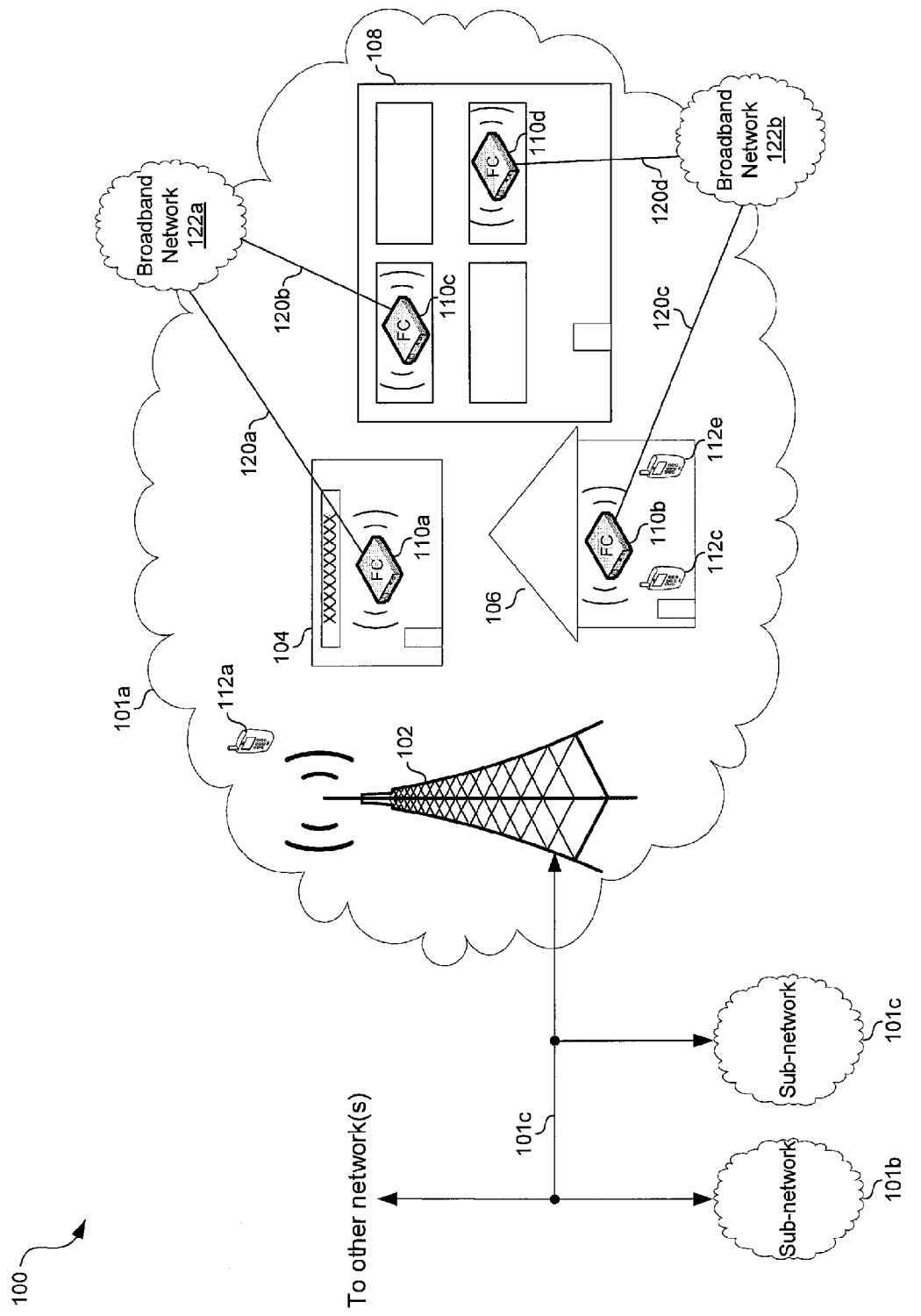
FIG. 1A is a diagram illustrating an exemplary cellular network, in accordance with an embodiment of the invention.

FIG. 1A is a diagram illustrating an exemplary cellular network, in accordance with an embodiment of the invention. Referring to FIG. 1A, there is shown a cellular network 100 comprising sub-networks 101a-101c. The exemplary sub-network 101a may comprise a base station 102, femtocells 110a-110d, which are collectively referred to herein as femtocells 110, and cellular enabled communication devices 112a and 112c, which are collectively referred to herein as cellular enabled communication devices 112. The femtocells 110 may be installed in one or more commercial properties 104, one or more residential properties 106, and/or one or more multi-tenant properties 108.

The commercial properties 104 may comprise, for example, stores, restaurants, offices, and municipal buildings. The residential properties 106 may comprise, for example, single-family homes, home offices, and/or town-houses. Multi-tenant properties 108 may comprise residential and/or commercial tenants such as apartments, condos, hotels, and/or high rises.

The base station 102 may be operable to communicate data wirelessly utilizing one or more cellular standards such as IS-95, CDMA, GSM, TDMA, GPRS, EDGE, UMTS/WCDMA, TD-SCDMA, HSDPA, extensions thereto, and/or variants thereof. "Data," as utilized herein, may refer to any analog and/or digital information including but not limited to voice, Internet data, and/or multimedia content. Multimedia content may comprise audio and/or visual content comprising, video, still images, animated images, and/or textual content. The base station 102 may communicate with cellular enabled communication devices such as the cellular enabled communication devices 112. Exemplary cellular standards supported by the base station 102 may be specified in the International Mobile Telecomunnications-2000 (IMT-2000) standard and/or developed by the $3^{rd}$ generation partnership project (3GPP) and/or the 3rd generation partnership project 2 (3GPP2). The base station 102 may communicate data amongst the various components of the sub-network 101a. Additionally, data communicated to and/or from the base station 102 may be communicated to sub-network 101b, sub-network 101c, and/or to one or more other networks (not shown) via one or more backhaul links 103. In this manner, data communicated to and/or from the base station 102 may be communicated to and/or from, other portions of the network 100 and/or other networks. Exemplary networks with which data may be communicated may comprise public switched telephone networks (PSTN) and/or IP networks such as the Internet or an intranet.

The femtocells 110 may each comprise suitable logic, circuitry, and/or code that may be operable to communicate wirelessly utilizing one or more cellular standards such as IS-95, CDMA, GSM, TDMA, GPRS, EDGE, UMTS/WCDMA, TD-SCDMA, HSDPA, extensions thereto, and/or variants thereof. In this regard, the femtocells 110 may each communicate with cellular enabled communication devices such as the cellular enabled communication devices 112. Exemplary cellular standards supported by the femtocells 110 may be specified in the International Mobile Telecomunnications-2000 (IMT-2000) standard and/or developed by the $3^{rd}$ generation partnership project (3GPP) and/or the $3^{rd}$ generation partnership project 2 (3GPP2). Additionally, the femtocells 110 may each comprise suitable logic, circuitry, and/or code that may be operable to communicate over an IP network. In various embodiments of the invention, the femtocells 110 may be enabled to support peer-to-peer communication.

The broadband sub-networks 122a and 122b, collectively referred to herein as sub-networks 122, may comprise, for example, satellite networks, cable networks, DVB networks, the Internet, or similar local or wide area networks, which are capable of conveying data which may comprise multimedia. The broadband connections 120a-120d, collectively referred to herein as broadband connections 120, may comprise optical, wired, and/or wireless links. A broadband sub-networks may comprise one or more non-cellular network nodes 124. The networks 122a and 122b and/or the connections 120a-120d may be owned and/or operated by a service and/or content provider (SP/CP). In this regard, each femtocell 110 may be owned and/or operated by a service provider.

The cellular enabled communication devices 112 may each comprise suitable logic, circuitry, and/or code that may be operable to communicate utilizing one or more cellular standards. In this regard, the cellular enabled communication devices 112 may each be operable to transmit and/or receive data via the cellular network 100. Exemplary cellular enabled communication device may comprise laptop computers, mobile phones, and personal media players. The cellular enabled communication devices 112 may be enabled to receive, process, and present multimedia content and may additionally be enabled run a web browser or other applications for providing Internet services to a user of the cellular enabled communication device 112.

In operation, cellular enabled communication devices within a femtocell's coverage area may communicate via the femtocell without a need for data to traverse an IP network or a wide area cellular network. For example, the cellular enabled communication device 112c may place a call destined for the cellular enabled communication device 112e. The femtocell 110b may receive the call request and determine that the cellular enabled communication device 112e is also within the coverage area of the femtocell 110b. Accordingly, the femtocell 110b may establish communication channels with the cellular enabled communication device 112c and the cellular enabled communication device 112e. The femtocell 110b may then utilize the established cellular communication channels to relay the call between the cellular enabled communication devices 112c and 112e. The communications may not be limited to voice calls however. In this regard, any data may be communicated between the cellular enabled communication devices 112c and 112e via the femtocell 110b. For example, the cellular enabled communication device 112e may stream multimedia content to the cellular enabled communication device 112c. In this manner, peer-to-peer cellular communications between the cellular enabled communication devices 112c and 112e. That is, the cellular enabled communication devices 112c and 112e may communicate without a need for communicating data to the base station 102 or networks such as the networks 122. Thus, the cellular communications between the device 112c and 112e may place little or no burden on any cellular infrastructure, other than the femtocell 110b, and may place little or no burden on an the networks 122 to which the femtocell 110b may be communicatively coupled.

In various embodiments of the invention, the femtocells 110 may be configured based on policies and/or preferences of one or more service and/or content providers. In this regard, the femtocell 110b may be configured to restrict or block peer-to-peer communications. For example, blocking peer-to-peer connections may provide increased security for the cellular enabled communication devices by preventing unknown and/or suspect cellular enabled devices from communicating with other cellular enabled devices. Similarly, blocking peer-to-peer communications may prevent the sharing of copyrighted or other restricted content and/or information. In this regard, restrictions and/or blocking of peer-to-peer communications may be content specific.

Figure 1B:
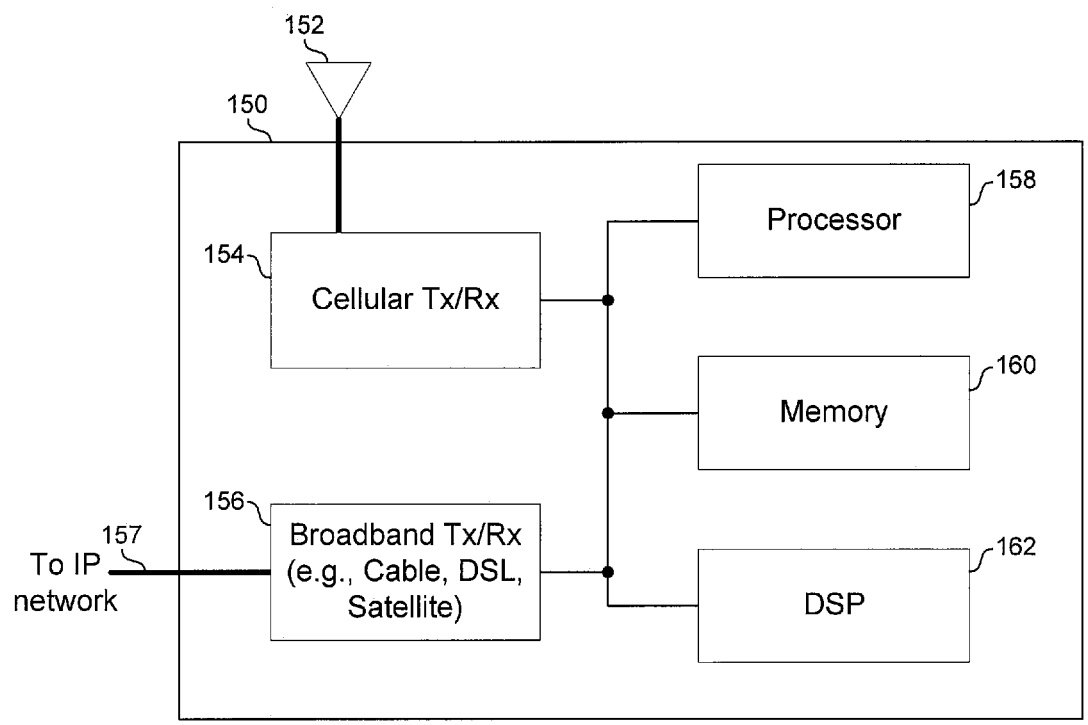
FIG. 1B is a diagram illustrating an exemplary block diagram of a femtocell, in accordance with an embodiment of the invention.

FIG. 1B is a diagram illustrating an exemplary block diagram of a femtocell, in accordance with an embodiment of the invention. Referring to FIG. 1B, there is shown a femtocell 150 comprising an antenna 152, a cellular transmitter and/or receiver (Tx/Rx) 154, a broadband transmitter and/or receiver (Tx/Rx) 156, a processor 158, a memory 160, and a digital signal processor (DSP) 162. The femtocell may be similar to or the same as the femtocells 110 described with respect to FIG. 1B.

The antenna 152 may be suitable for transmitting and/or receiving cellular signals. Although a single antenna is illustrated, the invention is not so limited. In this regard, the cellular Tx/Rx 154 may utilize a common antenna for transmission and reception, may utilize different antennas for transmission and reception, and/or may utilize a plurality of antennas for transmission and/or reception.

The cellular Tx/Rx 154 may comprise suitable logic circuitry and/or code that may be operable to transmit and/or receive voice and/or data utilizing one or more cellular standards. The cellular Tx/Rx 154 may be operable to perform amplification, down-conversion, filtering, demodulation, and analog to digital conversion of received cellular signals. The cellular Tx/Rx 154 may be operable to perform amplification, up-conversion, filtering, modulation, and digital to analog conversion of transmitted cellular signals. Exemplary cellular standards supported by the femtocells 110 may be specified in the International Mobile Telecomunnications-2000 (IMT-2000) standard and/or developed by the $3^{rd}$ generation partnership project (3GPP) and/or the $3^{rd}$ generation partnership project 2 (3GPP2).

The broadband Tx/Rx 156 may comprise suitable logic, circuitry, and/or code that may be operable to transmit voice and/or data in adherence to one or more broadband standards. The broadband Tx/Rx 156 may be operable to perform amplification, down-conversion, filtering, demodulation, and analog to digital conversion of received signals. The broadband Tx/Rx 156 may be operable to perform amplification, up-conversion, filtering, modulation, and digital to analog conversion of transmitted signals. In various exemplary embodiments of the invention, the broadband Tx/Rx 156 may transmit and/or receive voice and/or data over a link 157 which may comprise, for example, T1/E1 line, passive optical network (PON), DSL, cable television infrastructure, satellite broadband internet connection, satellite television infrastructure, and/or Ethernet.

The processor 158 may comprise suitable logic, circuitry, and/or code that may enable processing data and/or controlling operations of the femtocell 150. In this regard, the processor 158 may be enabled to provide control signals to the various other blocks comprising the femtocell 150. The processor 158 may also control data transfers between various portions of the femtocell 150. Additionally, the processor 158 may enable execution of applications programs and/or code. In various embodiments of the invention, the applications, programs, and/or code may enable, for example, parsing, transcoding, or otherwise processing data. In various embodiments of the invention, the applications, programs, and/or code may enable, for example, configuring or controlling operation of the cellular transmitter and/or receiver 154, the broadband transmitter and/or receiver 156, the DSP 162, and/or the memory 160.

The memory 160 may comprise suitable logic, circuitry, and/or code that may enable storage or programming of information that includes parameters and/or code that may effectuate the operation of the femtocell 150. The parameters may comprise configuration data and the code may comprise operational code such as software and/or firmware, but the information need not be limited in this regard. Moreover, the parameters may include adaptive filter and/or block coefficients. Additionally, the memory 160 may buffer or otherwise store received data and/or data to be transmitted. In various embodiments of the invention, the memory 150 may comprise one or more look-up tables utilized for determining cellular enabled communication devices within a coverage area of the femtocell 150.

The DSP 162 may comprise suitable logic, circuitry, and/or code operable to perform computationally intensive processing of data. In various embodiments of the invention, the DSP 162 may encode, decode, modulate, demodulate, encrypt, decrypt, scramble, descramble, and/or otherwise process data. In various embodiments of the invention, the DSP 162 may be enabled adjust a modulation scheme, error coding scheme, and/or data rates of transmitted cellular signals data.

Figure 2A:
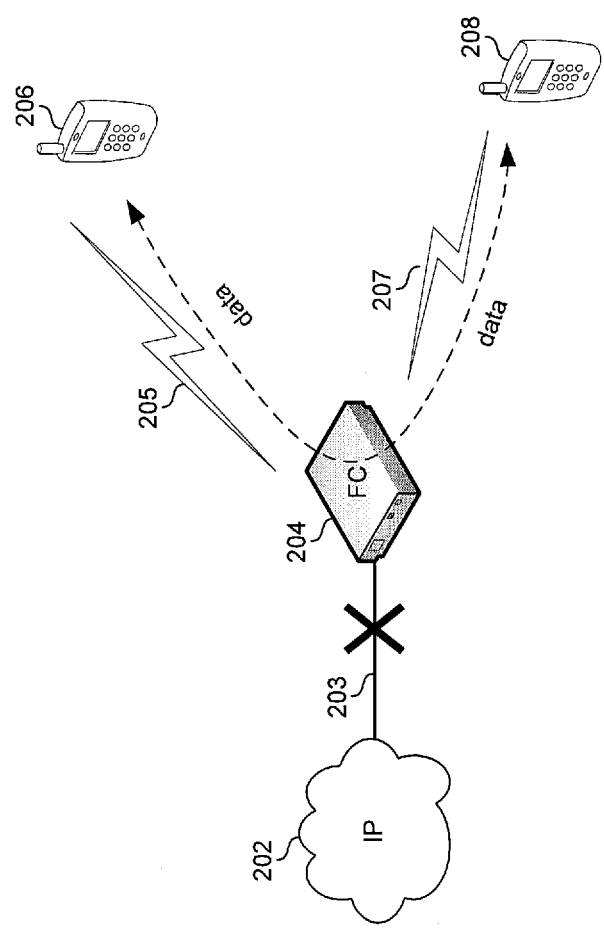
FIG. 2A is a diagram illustrating peer-to-peer cellular communication via a femtocell, in accordance with an embodiment of the invention.

In operation, the femtocell may support peer-to-peer cellular communication between two or more cellular enabled communication devices within the coverage area of the femtocell 150. In this regard, the cellular Tx/Rx 154 may receive cellular signals from a first cellular enabled communication device via a cellular communication channel. The cellular Tx/Rx 154 may amplify, down-convert, demodulate, or otherwise process the received cellular signals to convert them to baseband. The baseband signals may then be conveyed to the processor 158, the memory 160, and/or the DSP 162 for buffering and/or processing prior to forwarding the cellular signals and/or data contained therein to a second cellular enabled communication device via a cellular communication channel. Processing prior to re-transmission may comprise, for example, transcoding, re-packetizing, or otherwise formatting the data for transmission to the second cellular enabled communication device. In various embodiments of the invention, the femtocell 150 may adjust the resolution, frame rate, compression, and/or color depth of video signals and/or adjust the sample rate and/or bit depth of audio signals. In various embodiments of the invention, the femtocell 150 may transcode cellular signals of a first standard to cellular signals of a second standard FIG. 2A is a diagram illustrating peer-to-peer cellular communication via a femtocell, in accordance with an embodiment of the invention. Referring to FIG. 2A, there is shown a femtocell 204, a cellular enabled communication device 206, and a cellular enabled communication device 208. The femtocell 204 may be communicatively coupled to an IP network 202 via a link 203.

The femtocell 204 may be similar to or the same as the femtocells 110 described with respect to FIG. 1. The cellular enabled communication devices 206 and 208 may be similar to the cellular enabled communication devices 112 described with respect to FIG. 1.

In operation, the cellular enabled communication device 206 may wish to communicate with the cellular enabled communication device 208 and may accordingly request a communication channel with the femtocell 204. The femtocell 204 may receive the request and may attempt to locate the cellular enabled communication device 208. The femtocell 204 may determine that the cellular enabled communication device 208 is within its coverage area by, for example, referencing a local look-up table or registry. Accordingly, the femtocell 204 may setup the cellular communication channels 205 and 207. Data may then be communicated between the cellular enabled communication devices 206 and 208 via the cellular communication channels 205 and 207. In this manner, communications between the cellular enabled communication devices 206 and 208 may have no need to traverse the link 203, the IP network 202, or a wide area cellular network (not shown). Accordingly, communication between the cellular enabled communication devices 206 and 208 may occur without placing any burden on the IP network or any cellular network, for example, a wide area cellular network.

Figure 2B:
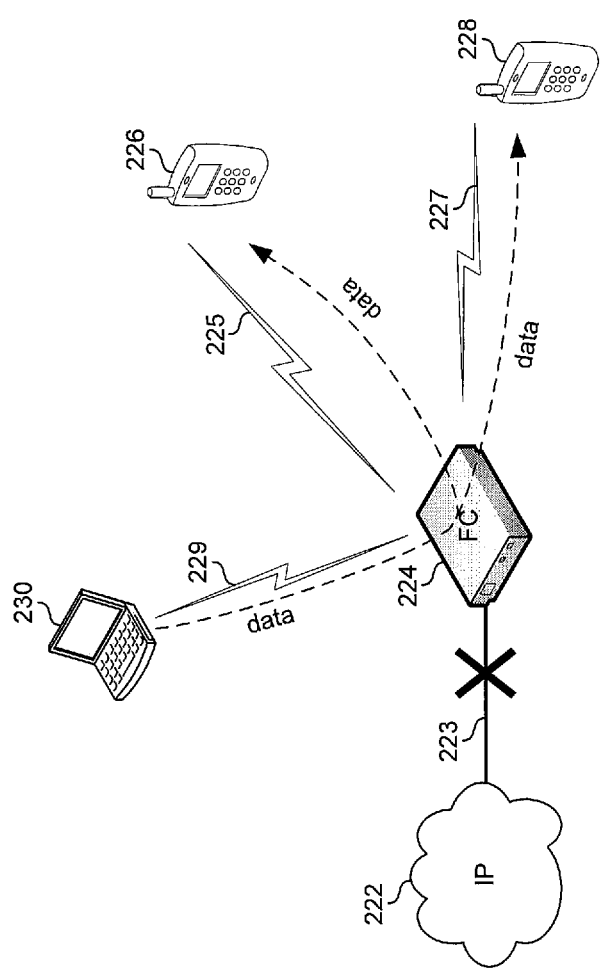
FIG. 2B is a diagram illustrating multicasting or broadcasting to a plurality of cellular enabled communication devices via a femtocell that enables peer-to-peer cellular communication, in accordance with an embodiment of the invention.

FIG. 2B is a diagram illustrating multicasting or broadcasting to a plurality of cellular enabled communication devices via a femtocell that enables peer-to-peer cellular communication, in accordance with an embodiment of the invention. Referring to FIG. 2B, there is shown a femtocell 224 and cellular enabled communication devices 226, 228, and 230. The femtocell 224 may be communicatively coupled to an IP network 222 via a link 223.

The femtocell 224 may be similar to or the same as the femtocells 110 described with respect to FIG. 1. The cellular enabled communication devices 226, 228, and 230 may be similar to the cellular enabled communication devices 112 described with respect to FIG. 1.

In operation, the cellular enabled communication device 230 may wish to broadcast data to cellular enabled communication devices within in its coverage area. Accordingly, the cellular enabled communication device 230 may request a communication channel with the femtocell 224 and the femtocell 224 may setup the cellular communication channel 229. Additionally, the femtocell 224 may set up a cellular communication channel between itself and any available cellular enabled communication devices within its coverage area. In this regard, an available device may be a device without a currently established communication channel and/or a device that has indicated it would like to receive broadcast messages. In the embodiment of the invention shown, the cellular enabled communication devices 226 and 228 may each be available and thus the cellular communication channels 225 and 227 may be setup. Subsequently, broadcast data transmitted by the cellular enabled communication device 230 via the cellular communication channel 229 may be communicated to each of the cellular enabled communication devices 226 and 228 via the cellular communication channels 225 and 227.

Similarly, the cellular enabled communication device 230 may wish to multicast data to the cellular enabled communication devices 226 and 228. Accordingly, the cellular enabled communication device 230 may request a communication channel with the femtocell 224. The femtocell 224 may receive the request and may attempt to locate the cellular enabled communication devices 226 and 228. The femtocell 224 may determine that the cellular enabled communication devices 226 and 228 are within its coverage area. The determination may be performed utilizing a local look-up table, for example. Accordingly, the femtocell 224 may setup the cellular communication channel 229 between itself and the cellular enabled communication device 230, the cellular communication channel 225 between itself and the cellular enabled communication device 226, and the cellular communication channel 227 between itself and the cellular enabled communication device 208. Data may then be multicast from the cellular enabled communication device 230 to each of the cellular enabled communication devices 226 and 228. In this manner, data may be broadcast or multicast without a need to traverse the link 223, the IP network 222, or any other IP network; and without placing any burden on the IP network or any wide area cellular network.

Figure 2C:
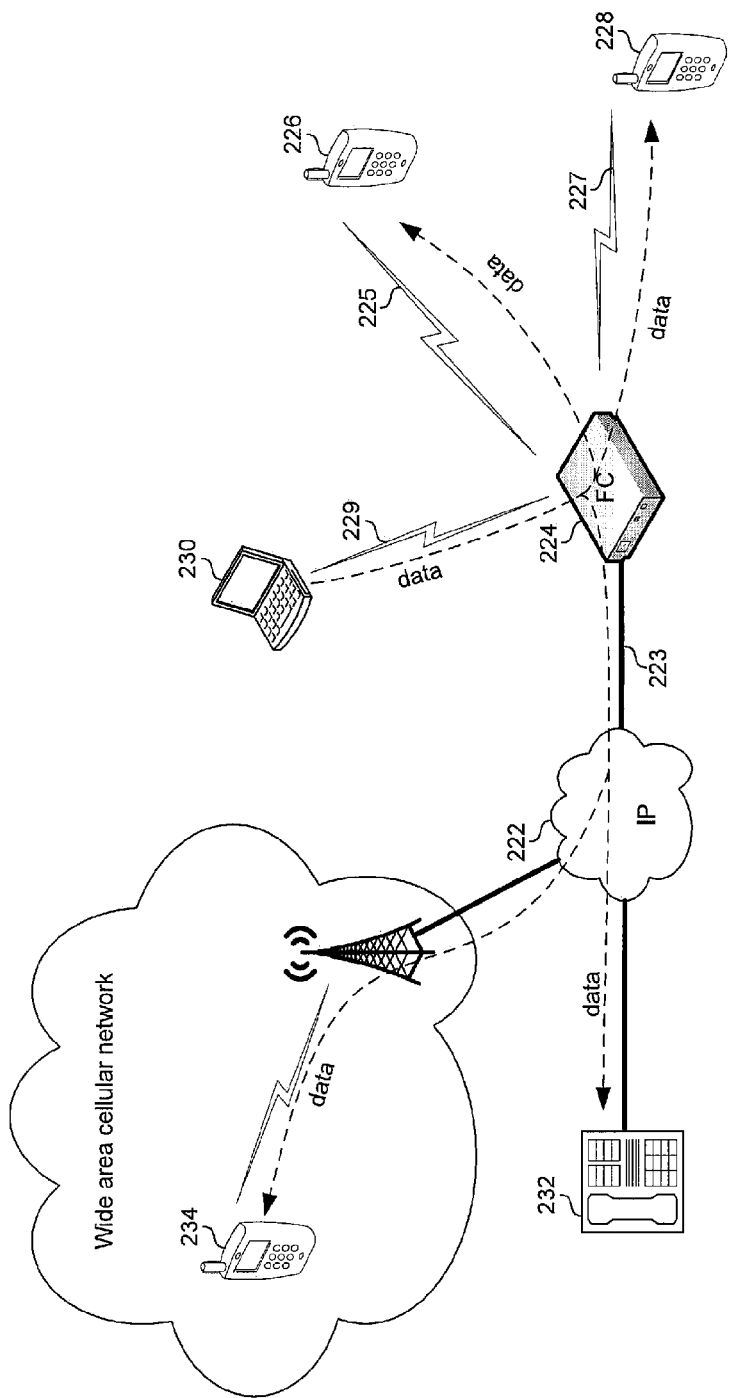
FIG. 2C is a diagram illustrating multicasting or broadcasting to a plurality of devices via a femtocell that enables peer-to-peer cellular communication, in accordance with an embodiment of the invention.

FIG. 2C is a diagram illustrating multicasting or broadcasting to a plurality of devices via a femtocell that enables peer-to-peer cellular communication, in accordance with an embodiment of the invention. In FIG. 2C, in addition to broadcasting or multicasting data to cellular enabled communication devices as described with respect to FIG. 2, the femtocell 224 may additionally forward broadcast and/or multicast data over its IP connection. Accordingly, broadcast and/or multicast data may be communicated to devices which may not support cellular communications, such as the device 232, or cellular enabled communication devices not in the coverage area of the femtocell 224 but within the coverage area of a wide area cellular network, such as the device 234.

Figure 2D:
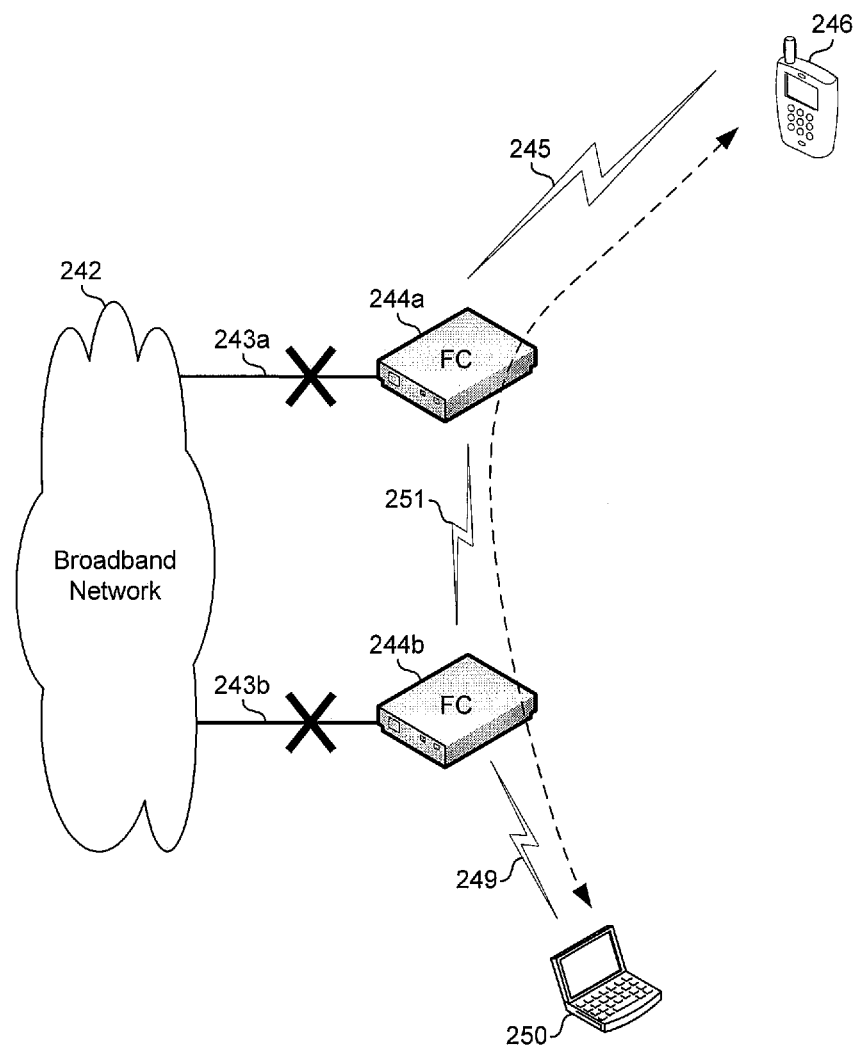
FIG. 2D is a diagram illustrating peer-to-peer cellular communications via a plurality of femtocells, in accordance with an embodiment of the invention.

FIG. 2D is a diagram illustrating peer-to-peer cellular communications via a plurality of femtocells, in accordance with an embodiment of the invention. Referring to FIG. 2D there is shown broadband network 242, femtocells 244a and 244b, and cellular enabled communication devices 246 and 250.

The broadband network 242 may be similar to or the same as the networks 122 described with respect to FIG. 1A. The femtocell 244 may be similar to or the same as the femtocells 110 described with respect to FIG. 1. The cellular enabled communication devices 246 and 250 may be similar to the cellular enabled communication devices 112 described with respect to FIG. 1.

In operation, the cellular enabled communication device 246 may wish to communicate with the cellular enabled communication device 250 and may accordingly request a communication channel with the femtocell 244a. The femtocell 244a may receive the request and may attempt to locate the cellular enabled communication device 250. The femtocell 244a may determine that the cellular enabled communication device 250 is within the coverage area of the femtocell 244b through one or more of a variety of techniques. For example, the femtocell 244a may query a femtocell registry in the network 242 via the connection 243a. Alternatively or additionally, the femtocell 244a may query the femtocell 244b via a cellular communication channel, for example a control channel reserved for inter-femtocell communications.

Subsequent to locating the cellular enabled communication device 250, the femtocell 244a may setup the cellular communication channels 245, 251, and 249. Data may then be communicated between the cellular enabled communication devices 246 and 250 via the cellular communication channels 245, 251, and 249. In this manner, communications between the cellular enabled communication devices 248 and 250 may have no need to traverse the links 243a or 243b, the broadband network 242, or a wide area cellular network (not shown). Accordingly, communication between the cellular enabled communication devices 246 and 250 may place little or no burden on the broadband network 242 or any cellular network, for example, a wide area cellular network.

Figure 3:
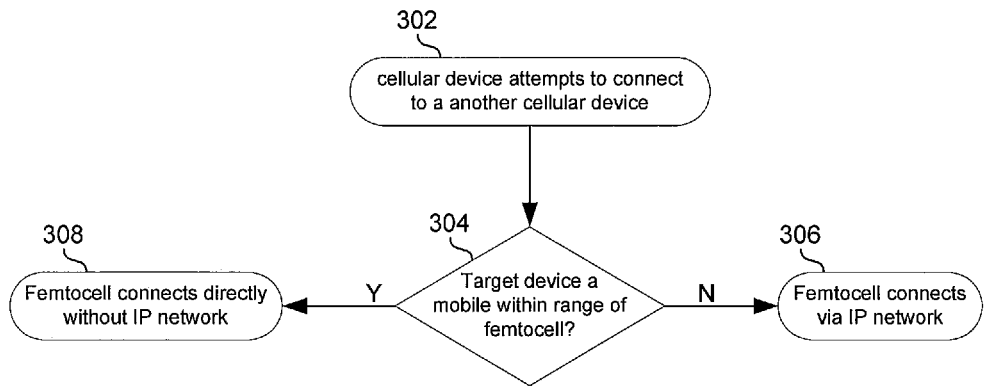
FIG. 3 is a flow chart illustrating exemplary steps for peer-to-peer cellular communications via a femtocell, in accordance with an embodiment of the invention.

FIG. 3 is a flow chart illustrating exemplary steps for peer-to-peer cellular communications via a femtocell, in accordance with an embodiment of the invention. Referring to FIG. 3, the exemplary steps may begin with step 302 when a first cellular enabled communication device within a femtocell's coverage area attempts to connect to a target cellular enabled communication device. In this regard, the first cellular enabled communication device may place a call, send a message, or otherwise send data destined for the target cellular enabled communication device. Subsequent to step 302, the exemplary steps may advance to step 304.

In step 304, the femtocell may determine if the target cellular enabled communication device is within its coverage area. In instances that the target device is not within the femtocell's coverage area, the exemplary steps may advance to step 306.

In step 306, the femtocell may establish a communication channel with the target cellular enabled communication device via an IP connection and possibly another femtocell or wide area cellular network. Accordingly, data may be communicated between the first cellular enabled communication device and the target cellular enabled communication device via the communication channel which relies on the femtocell's IP connection.

Returning to step 304, in instances that the target device is within the femtocell's coverage area, the exemplary steps may advance to step 308.

In step 308, the femtocell may establish a cellular communication channel with the target cellular enabled communication device. Accordingly, data may be communicated between the first cellular enabled communication device and the target cellular enabled communication device without relying on the femtocell's IP connection.

Exemplary aspects of a method and system for peer-to-peer cellular communications are provided. In an exemplary embodiment of the invention, one or more cellular communication channels 225, 227, and 229 (FIG. 2C) may be established between a femtocell 224 and a plurality of communication devices 226, 228, and 230. The femtocell 224 may control the routing of data between the communication devices 226, 228, and 230 via the cellular communication channels 225, 227, and 229. The femtocell 224 may enable multicasting and/or broadcasting data from one of the communication devices 226, 228, and 230 to two or more remaining ones of the communication devices 226, 228, and 230. For example, the femtocell 224 may enable multicasting and/or broadcasting data from the communication devices 226 to the communication devices 228, and/or 230. The multicast and/or broadcast data may be communicated via the cellular communication channels 225, 227, and 229 and may be additionally communicated via an IP connection 223 to the femtocell 224. Data may be communicated over the cellular communication channels 225, 227, and 229 in compliance with 3rd generation partnership project (3GPP) standards and/or 3rd generation partnership project 2 (3GPP2) standards. The data may comprise voice, internet data, and/or multimedia content. The femtocell 224 may reformat data prior to communicating it to one or more of the communication devices 226, 228, and 230. One or more look-up tables may be utilized to determine whether a communication device is within cellular communication range of the femtocell.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for peer-to-peer cellular communications.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method performed by a first femtocell, the method comprising:
   establishing a first cellular communication channel between said first femtocell and a first communication device;
   receiving, from said first communication device via said established first cellular communication channel, data destined for a second communication device;
   after receiving said data, establishing a second cellular communication channel between said first femtocell and a second femtocell;
   determining, via said second cellular communication channel, if said second communication device is within a coverage area of said second femtocell; and
   in response to determining that said second communication device is within the coverage area of said second femtocell, routing said data to said second femtocell via said second cellular communication channel.

2. The method according to claim 1, further comprising multicasting said data to a plurality of communication devices.

3. The method according to claim 2, wherein said multicasting comprises:
   multicasting said data to a portion of said plurality of communication devices via an IP connection of said first femtocell.

4. The method according to claim 1, further comprising broadcasting said data to a plurality of communication devices.

5. The method according to claim 4, wherein said broadcasting comprises:
   broadcasting said data to a portion of said plurality of communication devices via an IP connection of said first femtocell.

6. The method according to claim 1, wherein said data is communicated over one or both of said first cellular communication channel and said second cellular communication channel in compliance with 3rd generation partnership project (3GPP) standards.

7. The method according to claim 1, wherein said data is communicated over one or both of said first cellular communication channel and said second cellular communication channel in compliance with 3rd generation partnership project 2 (3GPP2) standards.

8. The method according to claim 1, wherein said data comprises voice, internet data, and/or multimedia content.

9. The method according to claim 1, further comprising:
   reformatting, by said first femtocell, said data to a new format prior to forwarding said data in said new format to said second femtocell.

10. A system for communications, the system comprising:
    one or more circuits for use in a first femtocell, wherein said one or more circuits are configured to:
       establish a first cellular communication channel between said first femtocell and a first communication device;
       receive, from said first communication device via said established first cellular communication channel, data destined for a second communication device;
       after receiving said data, establish a second cellular communication channel between said first femtocell and a second femtocell;
       determine, via said second cellular communication channel, if said second communication device is within a coverage area of said second femtocell; and
       in response to determining that said second communication device is within the coverage area of said second femtocell, route said data to said second femtocell via said second cellular communication channel.

11. The system according to claim 10, wherein said one or more circuits are further configured to multicast said data to a plurality of communication devices.

12. The system according to claim 11, wherein said one or more circuits are configured to multicast said data to a portion of said plurality of communication devices via an IP connection of said first femtocell.

13. The system according to claim 10, wherein said one or more circuits are further configured to broadcast said received data to a plurality of communication devices.

14. The system according to claim 13, wherein said one or more circuits are configured to broadcast said data to a portion of said plurality of communication devices via an IP connection of said femtocell.

15. The system according to claim 10, wherein said data is communicated over one or both of said first cellular communication channel and said second cellular communication channel in compliance with 3rd generation partnership project (3GPP) standards.

16. The system according to claim 10, wherein said data is communicated over one or both said first cellular communication channel and said second cellular communication channel in compliance with 3rd generation partnership project 2 (3GPP2) standards.

17. The system according to claim 10, wherein said data comprises voice, internet data, and/or multimedia content.

18. The system according to claim 10, wherein said one or more circuits are further configured to reformat said data to a new format prior to forwarding said data in said new format to said second femtocell.

19. A method, comprising:
    performing by a femtocell:
       establishing a cellular communication channel between the femtocell and a communication device;
       receiving data from said communication device via said established cellular communication channel;
       establishing a second cellular communication channel between said femtocell and a first plurality of communication devices; and
       multicasting or broadcasting said data to the first plurality of communication devices via the second cellular communication channel, and to a second plurality of communication devices via an IP connection of said femtocell, wherein the second plurality of communication devices do not support cellular communication.

20. The method according to claim 19, wherein the first plurality of communication devices are within a coverage area of said femtocell.

21. The method according to claim 19, further comprising establishing a third communication channel between said femtocell and a third plurality of communication devices.

22. The method according to claim 21, wherein the third plurality of communication devices are within a wide area cellular network.

23. The method according to claim 22, wherein an IP connection is established between said femtocell and said wide area cellular network.

* * * * *